(12) United States Patent
Ghassaei

(10) Patent No.: US 11,495,000 B2
(45) Date of Patent: Nov. 8, 2022

(54) THREE-DIMENSIONAL FOLDING TOOL

(71) Applicant: ADOBE INC., San Jose, CA (US)

(72) Inventor: Amanda Paige Ghassaei, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/871,245

(22) Filed: May 11, 2020

(65) Prior Publication Data
US 2021/0350632 A1 Nov. 11, 2021

(51) Int. Cl.
*G06T 19/20* (2011.01)
*G06F 3/04845* (2022.01)
*G06F 3/04815* (2022.01)

(52) U.S. Cl.
CPC .......... *G06T 19/20* (2013.01); *G06F 3/04815* (2013.01); *G06F 3/04845* (2013.01)

(58) Field of Classification Search
CPC .. G06T 19/20; G06F 3/04845; G06F 3/04815
See application file for complete search history.

(56) References Cited

U.S. PATENT DOCUMENTS

| | | | |
|---|---|---|---|
| 6,525,745 B1 * | 2/2003 | Phelan | G06T 17/10 345/676 |
| 10,579,237 B2 * | 3/2020 | Hatfield | G06F 3/04883 |

OTHER PUBLICATIONS

Christensen, Lars, "Fusion 360—Sheet Metals New Bend Feature—Ask LarsLive", published at https://www.youtube.com/watch?v=8uHdfrp-Tcc as of May 6, 2019, video time 5:06 total run time (Year: 2019).*
Eyedesyn, "Cinema 4D tutorial—Folding Objects Using Joints & Pose Morph Tag in Cinema 4D", published as of Jan. 6, 2015 at https://www.youtube.com/watch?v=I2_DyWbLruQ, video run time 17:24 (Year: 2015).*
Autodesk, "Video: Angle To Plane Around Edge", published as of as of Oct. 16, 2018 at https://knowledge.autodesk.com/support/civil-3d/learn-explore/caas/CloudHelp/cloudhelp/2019/ENU/Civil3D-PartsEditor/files/GUID-EC76A51E-E1C3-433A-AEE4-328F6234A4A3-htm.html, including video with time 1:54 (Year: 2018).*
AutoCAD 3D ("AutoCAD 3D—Using 3 Point UCS to Determine Valley Gutter (or Hip) Angles", posted by emmockladdie on YouTube as of Nov. 20, 2013, published at https://www.youtube.com/watch?v=RHQBI2a0_K4) (Year: 2013).*
Screen capture from YouTube video clip entitled "Fusion 360—Sheet Metal Bend Feature" 1 page, uploaded on May 17, 2019 by user "Synergis Engineering Design Solutions". Retrieved from the Internet: <https://www.youtube.com/watch?v-fWG-FPWj8JU>.

* cited by examiner

*Primary Examiner* — William A Beutel
(74) *Attorney, Agent, or Firm* — Shook, Hardy & Bacon L.L.P.

(57) ABSTRACT

Embodiments of the present invention are directed to facilitating folding of virtual objects via a three-dimensional folding tool. In embodiments, a foldable virtual object having a set of one or more fold lines is presented. A user may select a particular fold line. Based on the user selection, a three-dimensional folding tool is presented in association with the selected fold line. The three-dimensional folding tool can include a first handle on a first panel adjacent to the selected fold line and a second handle on a second panel adjacent to the selected fold line. In accordance with detecting movement of the first handle in a direction, the first panel is folded or rotated about the fold line in the direction of the movement of the first handle, while the position of the second panel is maintained.

20 Claims, 10 Drawing Sheets

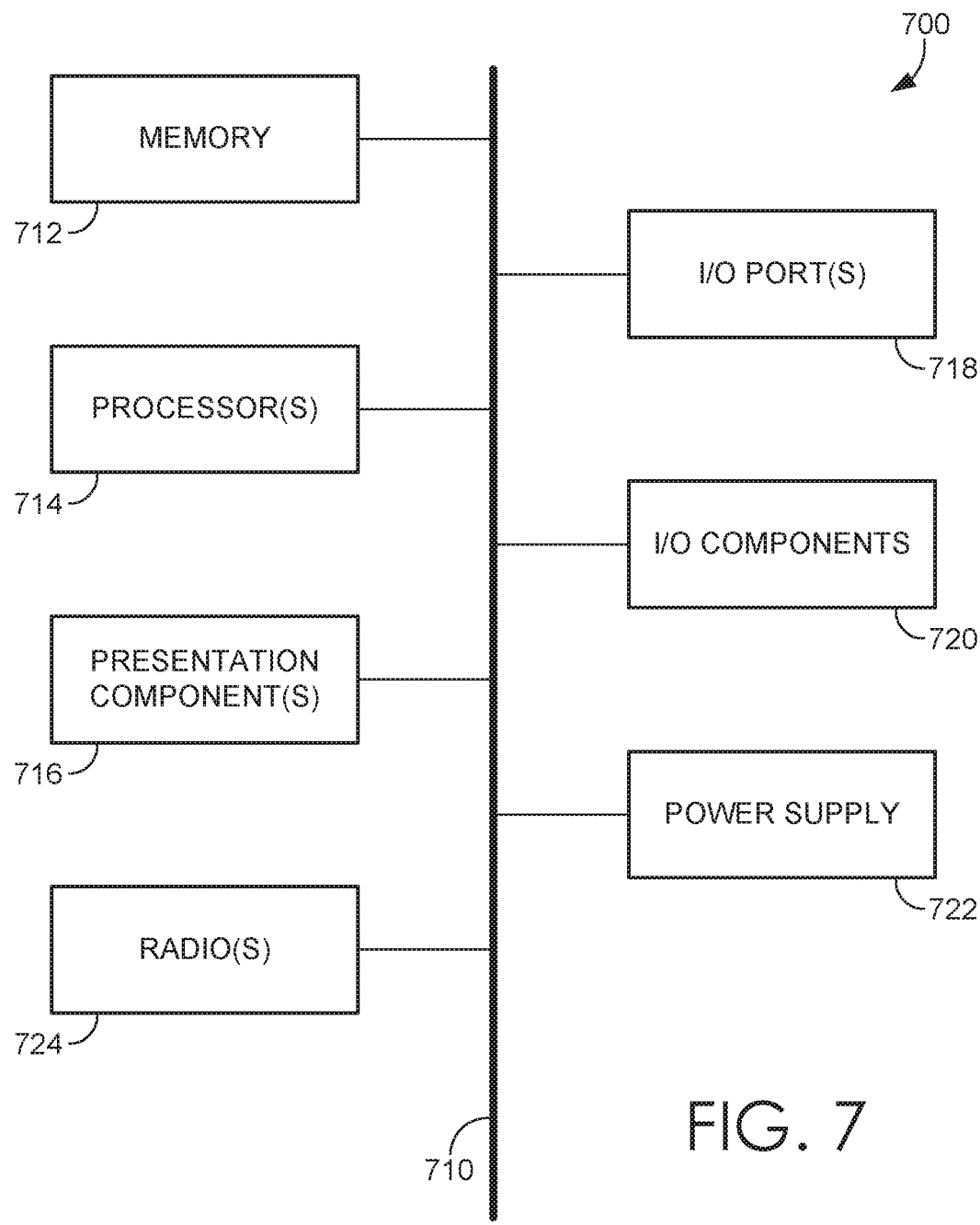

THREE-DIMENSIONAL FOLDING TOOL

BACKGROUND

Oftentimes, a user might desire to visualize a flat, or two-dimensional, virtual object in three dimensions. Visualizing virtual objects in three-dimensions allows designers to iterate faster and reduce manufacturing errors. In particular, users, such as designers, may desire to virtually fold an object to view the folded object in three dimensions. Graphic designers, however, often do not have a corresponding three-dimensional model for the virtual object (e.g., dieline) to enable three-dimension visualization.

SUMMARY

Aspects of the present disclosure relate to an intuitive three-dimensional folding tool that allows users to control virtual folding of virtual objects. The three-dimensional folding tool is positioned in connection with the virtual object to enable intuitive folding of the object. In particular, utilizing the three-dimensional folding tool described herein enables users to select a fold line(s) of interest and virtually fold an object in three dimensions while visualizing the modifications in real-time. A user can interact directly with an object via a three-dimensional graphical user interface to fold portions of the object.

In operation, a virtual object can be folded in a three-dimensional environment along fold lines. Each fold line can include two panels, or object panels, adjacent to the fold line (one on each side of the fold line). Generally, in accordance with a user selecting a fold line of the virtual object, the three-dimensional folding tool is presented. The three-dimensional folding tool includes two interactive handles that each extend toward the corresponding panels adjacent to the fold line about which the object can fold. By interacting with one of the handles (e.g., dragging a handle), the corresponding panel folds around the fold line. As a user continues moving the handle, the panel can continue to fold or rotate about the fold line (orthogonally to the fold line axis), for example, until it reaches a target angle. In accordance with interacting with one of the handles, the panel corresponding with the other handle automatically remains fixed in place during the folding operation. Accordingly, a user may intuitively and efficiently interact with the folding tool to facilitate folding of the virtual object.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 7 is a block diagram of an exemplary computing environment suitable for use in implementations of the present disclosure.

DETAILED DESCRIPTION

Figure 1:
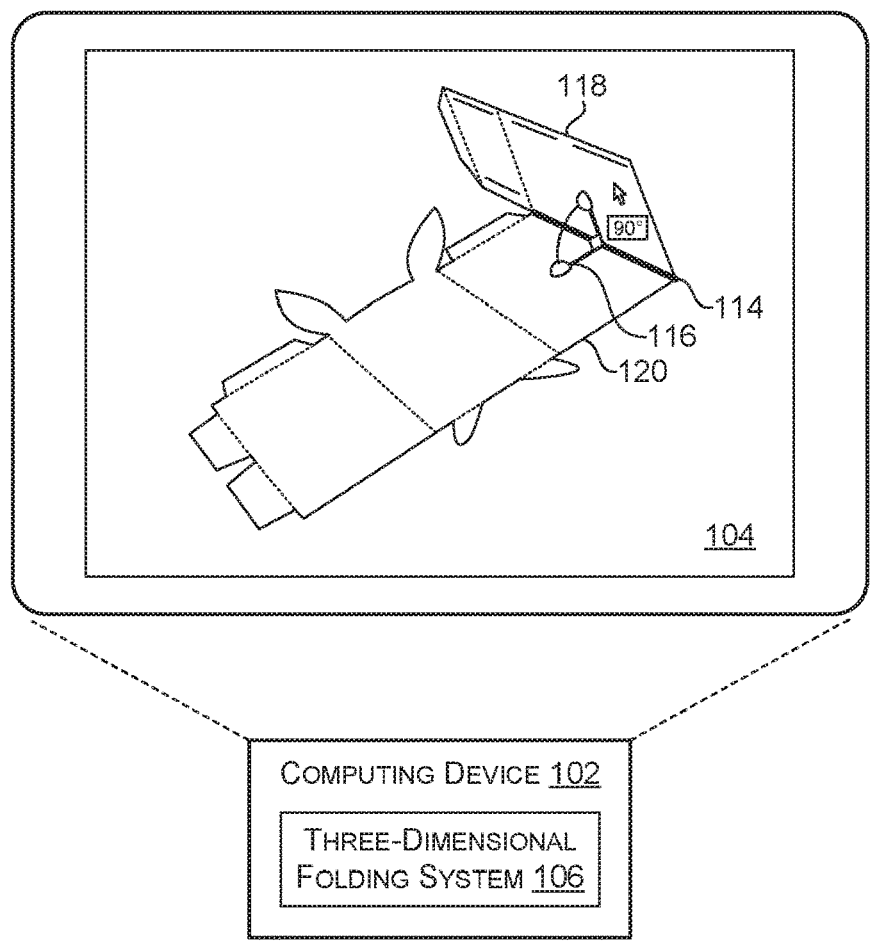
FIG. 1 is an illustration of an environment in an example implementation that is operable to employ three-dimensional folding techniques described herein.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Oftentimes, a user might desire to visualize a flat, or two-dimensional, virtual object in three dimensions. For instance, a graphic designer may provide a graphic design on a two-dimensional virtual object, but wish to visualize the object in a three-dimensional environment. As one example, a virtual product packaging template may be created in a dieline form using a two-dimensional design tool. A graphic designer may then create a graphical design for the dieline, for example, also using a two-dimensional design tool. Generally, visualizing the design on the virtual product packaging in three-dimensions is desired. For example, the package designer and/or graphic designer may wish to view the designed product package in three-dimensions in association with the virtual folds to appropriately visualize and validate the product packaging in its final form. Visualizing virtual objects and/or designs in three-dimensions allows designers to iterate faster and reduce manufacturing errors.

Graphic designers, however, often do not have a corresponding three-dimensional model for the two-dimensional virtual object (e.g., dieline) to enable three-dimension visualization. As such, to visualize a two-dimensional virtual object (e.g., product packaging) in a three-dimensional environment, oftentimes, a three-dimensional model is generated manually and visualized using a three-dimensional visualization software. For example, a user may generate a three-dimensional model of a packaging design using advanced computer automated design (CAD) tools.

Some tools have been developed to enable a user to virtually fold a dieline into a three-dimensional model. However, the user interface to do so can be tedious and may even require specialized technical knowledge of the software. One example of a conventional user interface for virtually folding a dieline includes a two-dimensional user interface panel, separate from the dieline. To effectuate virtual folding of the dieline, the user can input numbers, or adjust sliders, within the user interface panel. Not only is such an implementation inefficient, but obtaining user input via a separate two-dimensional user interface panel also does not translate well into fully immersive three-dimensional contexts, such as augmented reality (AR) and/or virtual reality (VR) environments. Another example of a conventional user interface for virtually folding a flat virtual object (a sheet of material) includes utilization of a three-dimensional widget. Utilization of the three-dimensional widget, however, still depends on information provided via a two-dimensional panel user interface component that is separate from the flat virtual object. Further, the three-dimensional widget is not presented until a fixed face for the folding operation has been specified. Accordingly, such conventional implementations can be inefficient and challenging to use.

As such, embodiments herein are directed to an intuitive three-dimensional folding tool that allows users to control virtual folding of virtual objects. As described, the three-dimensional folding tool is positioned in connection with the virtual object in the three-dimensional environment. Because the three-dimensional folding tool is contextualized within the three-dimensional environment of the virtual object, it provides a more intuitive solution for visualization and interaction with the virtual object as opposed to controlling virtual object manipulations via a separate two-dimensional panel. In particular, utilizing the three-dimensional folding tool described herein enables users to select a fold line(s) of interest and virtually fold an object in three dimensions while visualizing the modifications in real-time. A user can interact directly with an object via a graphical user interface without requiring the user to specify a numerical value to set the angles of the folds and/or select a face or portion of the object to maintain in a fixed position while rotating another portion about a fold.

In operation, a virtual object can be folded in a three-dimensional environment along fold lines. In this regard, the virtual object, also referred herein to as an object, is foldable in that each fold line (or crease) of the virtual object operates as a free-swinging hinge when folding manipulations are applied. Each fold line can include two panels, or object panels, adjacent to the fold line (one on each side of the fold line). An object panel, also referred to herein as a panel, may be a portion of the object that is positioned adjacent to a fold line and is foldable about the fold line. An object panel may be of any shape and size and is not intended to be limited herein. A three-dimensional environment generally refers to an environment or user interface that enables a virtual object to be viewed in three dimensions.

Generally, in accordance with a user selecting a fold line of the virtual object, the three-dimensional folding tool is presented. As an example, upon a user selection of a particular fold line, the three-dimensional folding tool is presented at the center of the fold line. The three-dimensional folding tool includes two interactive handles that each extend toward the corresponding panels adjacent to the fold line about which the object can fold. By interacting with one of the handles (e.g., dragging a handle), the corresponding panel folds around the fold line. As a user continues moving the handle, the panel can continue to fold or rotate about the fold line (orthogonally to the fold line axis), for example, until it reaches a target angle. In accordance with interacting with one of the handles, the panel corresponding with the other handle automatically remains fixed in place during the folding operation. Accordingly, a user may intuitively and efficiently interact with the folding tool to facilitate folding of the virtual object.

Turning now to FIG. 1, a block diagram is provided showing an example of an operating environment in which some implementations of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

FIG. 1 is an illustration of an environment 100 in an example implementation that is operable to employ a three-dimensional (3D) folding system described herein. The illustrated environment 100 includes computing device 102 having a display screen 104 on which a user interface may be displayed to support user interaction. The computing device 102 may be configured in a variety of ways. The computing device 102, for instance, may be configured as a desktop computer, a laptop computer, a mobile device (e.g., a handheld configuration such as a tablet or mobile phone as illustrated), and so forth. In some implementations, the computing device 102, such as a portable or mobile device, includes the display screen 104 (as illustrated in FIG. 1). That is, a display screen is integrated or coupled with the computing device. In other implementations, a display screen 104 is remote from, but in communication with, the computing device. The display screen is a screen or monitor that can visually present, display, or output information, such as, for example, objects.

Although a single computing device 102 is shown, the computing device 102 may be representative of a plurality of different devices, such as multiple servers utilized to perform operations "over the cloud." As an example, at least a portion of the functionality described in association with the three-dimensional folding system may be performed via a server or set of servers in communication with the computing device 102.

The computing device 102 is illustrated as including a three-dimensional folding system 106. The three-dimensional folding system 106 is representative of functionality of the computer device 102 to provide, render, and/or edit virtual objects in a three-dimensional environment for display by the display device 104. A virtual object, also referred to herein as an object, generally refers to any object or image that can be presented. The three-dimensional folding system 106 is generally representative of functionality to enable a user to effectuate folding of an object in a three-dimensional environment. A three-dimensional environment may include a three-dimensional graphical user interface (GUI) or augmented reality (AR) or virtual reality (VR) environment.

The three-dimensional folding system 106 may also accept and process user inputs to manipulate objects within the three-dimensional environment. A user, for example, may provide inputs using a selector/cursor control device, touch, gesture, stylus, and so on to manipulate objects within a three-dimensional environment. For example, with a touch screen implementation, a touchscreen display enables detection of location of touches or contact within a display area. In this regard, a touchscreen display refers to a display screen to which a user can provide input or interact therewith by making physical contact or near contact with the display screen. An illustrative example includes a user utilizing his or her finger to tap or move, or use some other form of touch action, to interact with a user device. Other items, such as a stylus, fingernail, etc., may be used to provide input to the device by way of touchscreen display. As such, a touchscreen display can be used as an input component irrespective of whether a keyboard or mouse is used as an input component for interacting with displayed content. As another example, in a virtual or augmented reality environment, a user may provide gestures as inputs. As yet another example, a mouse or selector may be used to provide inputs to manipulate objects.

Although the three-dimensional folding system 106 is illustrated as a single component, it can be any number of components. The three-dimensional folding system 106 is generally representative of functionality to enable a user to effectuate and visualize folding of an object in a three-dimensional environment.

At a high level, three-dimensional folding system 106 folds an object in a three-dimensional view based on user input. To do so, a user may select a fold line 114 associated with an object. Based on selection of the fold line 114, a three-dimensional folding tool 116 is presented within the three-dimensional environment. In particular, the three-dimensional folding tool 116 can be generated and presented in association with the object. The three-dimensional folding tool 116 includes two handles attached to two corresponding panels 118 and 120 adjacent to the fold line 114. The handles enable a user to easily and efficiently manipulate a fold of the corresponding panel.

Assume that the user desires to visualize the object folding along the fold line 114. In such a case, the user can effectuate the object fold by interacting with the three-dimensional folding tool 116. For instance, to fold the panel 118 closer to panel 120 in the counter-clockwise direction, the user may select the handle associated with panel 118 and move the handle in the direction of panel 120. On the other hand, to fold panel 118 in the clockwise direction, the user may move the handle associated with panel 118 in the other direction. As can be appreciated, as two handles are utilized, one attached to panel 118 and one attached to panel 120, a user may select which panel to rotate about the selected fold line 114 by manipulating the handle corresponding with the desired panel to rotate. Advantageously, when a particular handle is selected or manipulated, the other handle (i.e., the handle not selected or manipulated) and corresponding panel are fixed in position such that it does not rotate or fold as the other panel is being folded.

Figure 2:
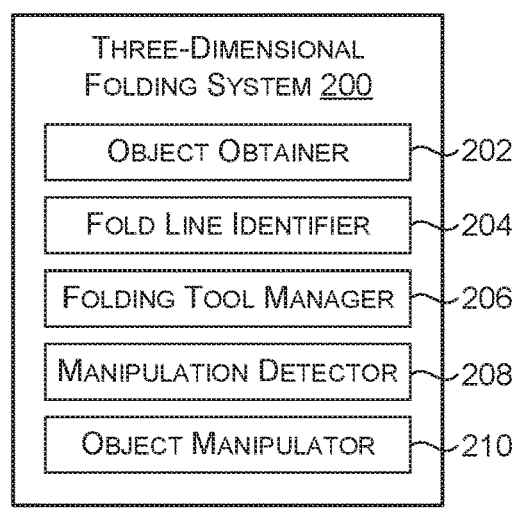
FIG. 2 depicts an implementation of a three-dimensional folding system, in accordance with embodiments of the present invention.

Turning now to FIG. 2, a block diagram is provided illustrating an exemplary three-dimensional folding system in which some embodiments of the present invention may be employed. The three-dimensional folding system is generally configured to facilitate folding an object in three-dimensional space, thereby generating a three-dimensional model of the object. As described, the three-dimensional folding system can operate and execute to generate a three-dimensional model of a folded object. An object or virtual object (referred to herein interchangeably) can be any foldable object, such as a package dieline, capable of being virtually folded in association with one or more fold lines. An object may be represented in two-dimensional or three-dimensional form. The three-dimensional folding tool enables a three-dimensional model to be generated to represent the foldable (e.g., two-dimensional object) in a three-dimensional environment in accordance with rotation or folding manipulations designated by a user.

In some cases, the three-dimensional folding system, or aspects thereof, may be incorporated into a two-dimensional graphic design system (e.g., ADOBE® Illustrator) and/or a three-dimensional visualization system or environment (e.g., ADOBE® Dimension). In other cases, the three-dimensional folding system may be used independently, but in conjunction with a two-dimensional graphic design system and/or a three-dimensional visualization system. For example, the three-dimensional folding system may take as input a two-dimensional object generated via a two-dimensional graphic design system and generate a three-dimensional model. The three-dimensional visualization system may then take as input the three-dimensional model generated via the three-dimensional folding system described herein, to enable rendering and visualization of the three-dimensional model.

As shown in FIG. 2, the three-dimensional folding system 200 includes object obtainer 202, fold line identifier 204, folding tool manager 206, manipulation detector 208, and object manipulator 210. It should be understood that this and other arrangements described herein are set forth only as examples. Other arrangements and elements (e.g., machines, interfaces, functions, orders, groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The object obtainer 202 is generally configured to obtain an object, or virtual object. In particular, the object obtainer 202 may obtain a foldable object, such as a dieline, capable of being virtually folded in association with one or more fold lines. In embodiments, a foldable object includes a set of one or more fold lines about which an object panel may be rotated or folded. Each fold line corresponds with two object panels adjacent to the fold lines, with one panel on each side of the fold line. An object panel, also referred to herein as a panel, refers to a portion of the object that can fold about a fold line. A panel may be in the form of various shapes and is not intended to be limited herein.

In some embodiments, the obtained object is a two-dimensional object (e.g., in two-dimensional vector form). To this end, a two-dimensional object may be a two-dimensional vector graphic. For example, an object may be a dieline in two-dimensional form. A dieline generally refers to a graphic design that assists in a proper layout (e.g., via cut and fold lines) of a document that may be used for diecutting as part of a finishing process. One example of a dieline is a package dieline that facilitates the layout of a package design (e.g., for product packaging).

In some cases, a two-dimensional object may be designed via a graphics tool that enables generating two-dimensional designs. Examples of such graphic design tools can include ADOBE® Illustrator (available from Adobe Systems, Inc. of San Jose, Calif.), or any other suitable graphic design tool. As such, an object may be imported or obtained from such a graphic tool used to generate a two-dimensional object, or a data store in which a two-dimensional object is stored.

Additionally or alternatively, an object may be obtained in a three-dimensional form. Such a three-dimensional object may be a three-dimensional vector graphic. By way of example only, the object may be a dieline in three-dimensional form. In some cases, a three-dimensional object may be designed via a graphics tool that enables generation of three-dimensional designs. In some cases, a three-dimensional object may be imported or obtained from another graphical tool used to generate a three-dimensional object, or a data store in which a three-dimensional object is stored.

As can be appreciated, in some embodiments, a three-dimensional folding system, such as three-dimensional folding system 300, may be capable of generating a two-dimensional or three-dimensional object. In such a case, a user may utilize the three-dimensional folding system 200 to generate a foldable object. For example, the three-dimensional folding system may convert dielines to a three-dimensional model and, thereafter, place in a three-dimensional scene.

The fold line identifier 204 is generally configured to identify fold lines associated with an object. A fold line refers to a line or segment at which a virtual fold of the object may occur. Generally, a panel or portion of an object rotates about a fold line. A fold line essentially operates as a free-swinging hinge.

In some cases, fold lines are identified based on previous designations in the obtained object. For example, a dieline object (e.g., generated via a two-dimension graphic tool) generally includes fold lines that indicate locations or positions for folding, for example, a package design. Such fold lines may be indicated via a user when generating the object within the two-dimensional graphic tool. In other cases, fold lines may be identified based on a user indication within the three-dimensional folding system 300. For example, upon presenting an object, a user may specify a location for a fold line.

As previously described, a fold line may be represented in any number of forms, such as a solid line, a perforated or dashed line, etc. A perforated or dashed line may be used to indicate a fold line or, in some cases, a line at which a product is to be scored or cut. In either case, in a three-dimensional environment, the perforated line may perform as a fold line, that is, a line about which a panel of the object rotates. As such, the fold line identifier 204 may identify the perforated lines and create a single fold line therefrom. Generating such a fold line enables a single line to be selected and used for folding the object.

As can be appreciated, in accordance with identifying fold lines, the fold line identifier 204, or another component, may convert a dieline, including a two-dimensional vector file, to a three-dimensional model and position the three-dimensional object in the three-dimensional scene. Such a three-dimensional object may include some thickness according to a material (e.g., a selected material such as cardboard, or a specific thickness thereof). The three-dimensional object may initially be presented in a flat manner, but thereafter folded in accordance with embodiments described herein.

As the three-dimensional object is presented, identified fold lines may also be presented. In embodiments, the fold lines may be visually emphasized or shown in the presented object. For example, the three-dimensional folding system 300 may present fold lines in a color that is different from and distinguishes from other aspects or lines of the object.

The folding tool manager 206 is generally configured to manage the three-dimensional folding tool. In this regard, the folding tool manager 206 may provide the three-dimensional folding tool for presentation to a user via a display as well as manage manipulation of the three-dimensional folding tool. As described herein, the three-dimensional folding tool is positioned and structured to provide an intuitive graphical user interface for virtually folding an object.

In embodiments, the three-dimensional folding tool includes two handles that correspond with two panels of the object associated with the fold line. For example, in association with a fold line, one panel lies on one side of the fold line and another panel lies on the other side of the fold line. As the object is folded in three-dimensional space, at least one of the two panels is moved or rotated about the fold line. Generally, the two handles are attached to the corresponding panel. For example, a first handle is attached to a first panel and a second handle is attached to a second panel.

Advantageously, using two handles enables a simple and intuitive folding manipulation to be performed in association with the object. In particular, a user does not need to specify which panel to anchor or prevent from moving or rotating over a fold line. Rather, a user simply specifies which handle or object panel to move, and the other handle or object panel is automatically anchored, fixed, or maintained in place.

The three-dimensional folding tool may also include an arc or line that connects the two handles. The arc generally illustrates the rotation that may be applied to a panel. Stated differently, the arc illustrates the axis of rotation. In some cases, the three-dimensional folding tool may include an indication of the amount or degree that exists between the two panels and/or corresponding handles. For example, with an initial flat object (i.e., before any folding manipulations occur), an indication of 180 degrees may be provided in association with the three-dimensional folding tool. Such a degree indication may be presented automatically or based on a user selection. For example, in some cases, the degree indication may automatically persist in association with a three-dimensional folding tool. As another example, the degree indication may be presented upon a user hovering over the three-dimensional folding tool (or in proximity thereto), when a user has selected a handle of the three-dimensional folding tool, when a user is manipulating the three-dimensional folding tool, or the like.

In some embodiments, the folding tool manager 206 may provide or present a three-dimensional folding tool upon receiving a selection of a fold line. In this regard, upon a user selecting a fold line within an object, the three-dimensional folding tool can be presented. In other embodiments, the folding tool manager 206 may provide or present a three-dimensional folding tool in association with each identified fold line. For example, assume an object being presented includes three fold lines. In such a case, a three-dimensional folding tool may be presented in association with each fold line.

The three-dimensional folding tool may be placed in association with an object, or overlay an object, in any number of ways. As one example, the three-dimensional folding tool can be placed in the center of the length of the fold line. For example, the three-dimensional folding tool can be placed in the center of a user-selected fold line of an object. As another example, the three-dimensional folding tool may be placed at an end of a fold line (e.g., an end of the fold line closest to the bottom of the user interface). As yet another example, a three-dimensional folding tool may be placed in a location proximate or near the fold line, but not along the fold line. Advantageously, placing a three-dimensional folding tool within the presentation of the virtual object enables for an intuitive and efficient user experience. Generally, embodiments described herein include the three-dimensional folding tool being position in proximity to one or more fold lines, but other implementations are within the scope of embodiments. For example, a three-dimensional folding tool may be placed in a specific location within the graphical user interface.

Further, the three-dimensional folding tool may align with the axis of the fold line. In this regard, the fold line axis and/or rotation axis may be identified such that the arc can be generated or presented to illustrate the path of rotation.

In some cases, multiple fold lines of an object may be selected such that concurrent folding occurs in association with each selected fold line. For example, a user may select all fold lines or a portion of the fold lines. In such a case, a three-dimensional folding tool may be presented in association with each selected fold line or in association with one of the selected fold lines. As one example, a three-dimensional folding tool may be presented in connection with a first or last selected fold line, a longest fold line, a central fold line, or the like.

The manipulation detector 208 is generally configured to detect manipulation in association with a three-dimensional folding tool. Generally, and at a high level, the manipulation detector 208 detects a user indication or selection of a handle and manipulation thereof. For example, a user may select a handle corresponding with one of the panels adjacent to the fold line. In such a case, the manipulation detector 208 may identify selection of the handle and/or movement of the handle in a direction to indicate the direction of rotation.

A manipulation can take on any shape or pattern, such as, for example, a rotation or circular pattern, a stroke or straight line pattern, or the like. In embodiments, the manipulation detector 208 may identify manipulation data associated with a selection and/or manipulation of a three-dimensional folding tool by a user. Manipulation data refers to any data that indicates or describes a manipulation or selection provided by a user. As described herein, manipulation data may refer to manipulation of the three-dimensional folding tool and/or the object (e.g., an object panel). Manipulation data might include, for example, a position indicator, a direction indicator, a velocity indicator, an acceleration indicator, a magnitude indicator, a steering angle, a time component or time duration associated therewith, a center region indicator, or the like. A position indicator refers to an indication of a position, location, or area of a manipulation or selection (e.g., contact with a touchscreen display or selection or movement via a selector, such as a mouse). As such, a position indicator can be used to determine which handle of the three-dimensional folding tool is selected, or object panel associated therewith. Position indicators can also be used to determine a direction in which to fold the selected object panel.

A direction indicator refers to a direction of a manipulation, such as a rotation manipulation or a movement manipulation. A velocity indicator refers to a velocity of a manipulation. An acceleration indicator refers to an acceleration of a manipulation. A magnitude indicator refers to a magnitude, distance, extent, displacement, or degree of a manipulation. Any algorithm and/or lookup techniques can be utilized to normalize, determine, calculate, identify, and/or derive various types of manipulation data.

In embodiments, the manipulation detector 208 can record and store manipulation data. As can be appreciated, any amount of manipulation data can be recorded or stored. Further, manipulation data can be stored for any amount of time. For example, manipulation data may be temporarily stored such that the data is disposed upon rotation of an object panel.

The object manipulator 210 is configured to fold an object panel by rotating the object panel about the corresponding fold line. Generally, the object manipulator 210 manipulates an object panel(s) in real time in accordance with a manipulation applied by a user. As such, the object manipulator 210 initiates manipulation of object panels based on detected user manipulations. By way of example, if a rotation or stroke manipulation associated with a handle of the three-dimensional folding tool is detected, the object manipulator 210 initiates a rotation of an object panel corresponding with the manipulated handle.

Generally, the object manipulator 210 rotates or projects an object panel about the fold line. As such, in accordance with a user manipulation of a particular handle of the three-dimensional folding tool, the corresponding object panel rotates about the fold line. As described, the object panel may be rotated along the arc illustrated via the three-dimensional folding tool (e.g., connecting the two handles) as the arc generally illustrates the axis of rotation. In accordance with rotating the object panel corresponding with a handle of the three-dimensional folding tool, the other object panel adjacent to the folding line is automatically anchored or fixed in place such that it does not rotate about the folding line. As such, a user does not need to specify which panel to anchor or prevent from moving or rotating over a fold line. Rather, a user simply specifies which handle or object panel to move, and the other handle or object panel is automatically anchored, fixed, or maintained in place maintained without a user selection indicating to fix the location of the other panel.

To manipulate an object panel (e.g., rotate about a fold line), the object manipulator 210 may determine the panel within the object to manipulate. As described, a panel or an object panel is a region or area of an object that is to be manipulated, or folded, about a fold line. The object panel may take on any form or shape. In some embodiments, an object panel is identified based on a handle or object panel selected by a user. As such, a user may select (e.g., via a touch interaction or selector user interaction) either a handle or panel, or an area proximate to a handle or panel.

In embodiments, the object manipulator 210 utilizes manipulation data, such as manipulation data identified by the manipulation detector 208, to determine a manner in which to manipulate an object. Stated differently, manipulation data is utilized to determine manipulator attributes for use in manipulating an object, or panel(s) associated therewith. A manipulation attribute refers to any attribute or data associated with, describing, or indicating manipulation to apply to an object, or panel(s) associated therewith. Manipulation attributes might indicate, for instance, an axis or folding line for an object panel to rotate about, a direction for object panel rotation (e.g., positive (+), negative (−), clockwise, counter-clockwise, etc.), an angular displacement or magnitude for object panel rotation (e.g., degrees, angles, radians, revolutions, etc.), an angular speed for object panel rotation (e.g., radians per time unit, degrees per time unit, etc.), an angular velocity for object panel rotation (e.g., angular speed for an image and the axis about which the image is to rotate, for instance, measured in degrees per time unit or radians per time unit), an angular acceleration for object panel rotation (e.g., rate of change of angular velocity, for instance, measured in radians per second squared or degrees per second squared), or the like. Manipulation attributes might be measured or represented using any unit of measurement including, but not limited to, standardized measurements (e.g., International System of Unit) or other forms of measurement.

To determine one or more manipulation attributes, manipulation data associated with a set of position indicators might be analyzed. For example, manipulation direction, velocity, or the like corresponding with a set of position indicators associated with a selector, touch, or air movement gesture can be used to identify one or more manipulation attributes to utilize in manipulating an object, or object panel(s).

As previously described, a rotation or stroke manipulation associated with a handle or panel can indicate an intent to effectuate a rotation of the corresponding object panel. In this regard, in response to detecting a rotation or stroke, an object panel is rotated about the fold line corresponding with the object panel. The object manipulator 210 can determine the plane of rotation about a fold line based on an axis defined by the fold line. In this regard, the plane of rotation may be identified as orthogonal to the fold line axis. Such a plane of rotation can be determined based on the fold line axis without requiring a user to specify or indicate an axis of rotation for a panel(s).

By way of example, assume that a fold line lies along an x-axis. In such a case, the object panel is rotated in the yz-plane or about an x-axis (axis of rotation). The yz-plane of rotation is the plane orthogonal to the x-axis such that the x-axis is a surface normal of the yz-plane. Stated differently, the object panel can rotate (and only rotate) about the axis defined by the fold line. It is understood that use of an yz-plane as a plane of rotation is only exemplary and other configurations of planes and axes can be used to implement embodiments of the present invention.

The object manipulator 210 can determine a direction in which to rotate an object panel (e.g., in an yz-plane) about an axis (e.g., an x-axis). In this way, the object manipulator 210 can recognize whether to rotate the object panel clockwise or counter-clockwise, for instance, about a fold line axis. A direction in which to rotate the object panel might be based on, for example, the direction in which the set of position indicators are sequentially directed or proceeding. Typically, a direction in which to rotate an object panel can correlate to a direction of the user interaction. For instance, assume that a user drags a handle in a clockwise direction. As such, the object panel rotation can also be determined to be in the clockwise direction. Although the object panel rotation might typically be determined to occur in the same direction as a user manipulation, embodiments of the present invention are not intended to be limited thereto. For instance, in some implementations, it might be desired to rotate an object panel in the opposite direction as the user manipulation.

In addition to recognizing a direction in which to rotate an object panel, the object manipulator 210 can also determine an extent or magnitude with which to rotate the object panel. To do so, the object manipulator 210 may analyze the speed at which a user provides a manipulation. As can be appreciated, as a gesture is performed at a faster speed, the object panel in turn can be rotated at a faster rate, such that the user can control the speed at which an image is rotated.

In some embodiments, the object manipulator 210 may rotate object panels in a continuous manner. In additional or alternative embodiments, the object manipulator 210 may rotate object panels in accordance with snapping positions. Snapping positions generally refer to positions identified to which the object panel can "snap" or progress. For example, in some cases, snapping positions to which an object panel may rotate may correspond with 15 degree increments. As such, assume a flat object exists and a user moves a handle corresponding with a panel in a particular direction. In such a case, as the user moves the handle, the panel may rotate from 180 degrees to 165 degrees to 150 degrees, and so on. In addition or in the alternative to having preconfigured snapping points (e.g., degree increments), the object manipulator 210 may perform analysis to determine snapping positions. For example, based on an analysis (e.g., physical or geometrical analysis) of a dieline object and the various fold lines, and positions of such fold lines, snapping points may be determined. Based on the three-dimensional proximity of fold panels in association with multiple fold lines, various snapping positions, or snapping degree increments may be identified. For instance, a snapping point may correspond with an angle that results in two panels, or edges thereof, being collinear, coplanar, or flush when folded.

In some cases, rather than automatically snapping to identified snapping positions, the user interface may provide a visual indicator of a snapping point. For example, a position along the arc may be identified and presented to illustrate a snapping point. As another example, when a panel becomes coplanar with another panel, a visual indicator may be presented (e.g., highlighting of one or both panels).

As can be appreciated, in some implementations, a user may select or specify whether to continuously rotate a panel or rotate a panel in accordance with snapping positions. For example, a user may select one control to indicate continuous rotations and another control to indicate snapping rotations.

In some implementations, constraints may be imposed to constrain virtual folding. Constraints may include, for example, limitations on rotation of object panels. For instance, a user may input or select a particular amount of rotation at which to stop rotating. As one example, a user may specify that an object panel, or a set of object panels (e.g., all object panels) should not rotate to less than a 90 degree angle. As another example, a user may input or select snapping positions as a constraint, such as, only snapping rotation of object panels to increments of 45 degrees. As another example, a constraint may be such that a panel cannot be rotated beyond being coplanar with the other panel. In this way, a panel being rotated cannot rotate through or across the corresponding panel. As can be appreciated, these constraints are only examples and other constraints may be employed in accordance with embodiments of the present invention.

As previously described, in some implementations, multiple fold lines may be concurrently selected. In such implementations, when a user manipulates a three-dimensional folding tool, for example, by dragging or moving a handle in association with one panel, panels associated with each of the other selected fold lines may also be manipulated. By way of example only, assume a user selects three fold lines. In such a case, a three-dimensional fold tool may be presented along one of the fold lines. Now assume the user selects one of the handles of the three-dimensional fold tool and moves the handle in a particular direction. In this case, a panel(s) associated with each fold line may rotate around the corresponding fold line. In embodiments, the panel associated with the non-selected handle of the three-dimensional fold tool is fixed in place, while each of the other panels corresponding with selected fold lines can rotate. Each of the panels may rotate at the same degree or rate as the panel corresponding with the manipulated handle. In this regard, if the handle being dragged is resulting in a fold of a corresponding panel of 90 degrees, each of the other manipulated panels may also be folded by 90 degrees.

As described herein, the three-dimensional folding system 200 can generate three-dimensional models for the virtual object. For example, as described above, in accordance with identifying fold lines of a dieline, a three-dimensional model can be created to represent the three-dimensional object in a three-dimensional environment. Further, the initially presented three-dimensional object (e.g., in a flattened form), may be manipulated in accordance with embodiments described herein. Such three-dimensional models can be viewed and/or stored. In some cases, three-dimensional models can be exported to a three-dimensional visualization system for rendering and visualizing in three-dimensions (e.g., a photorealistic visualization).

Figure 3A:
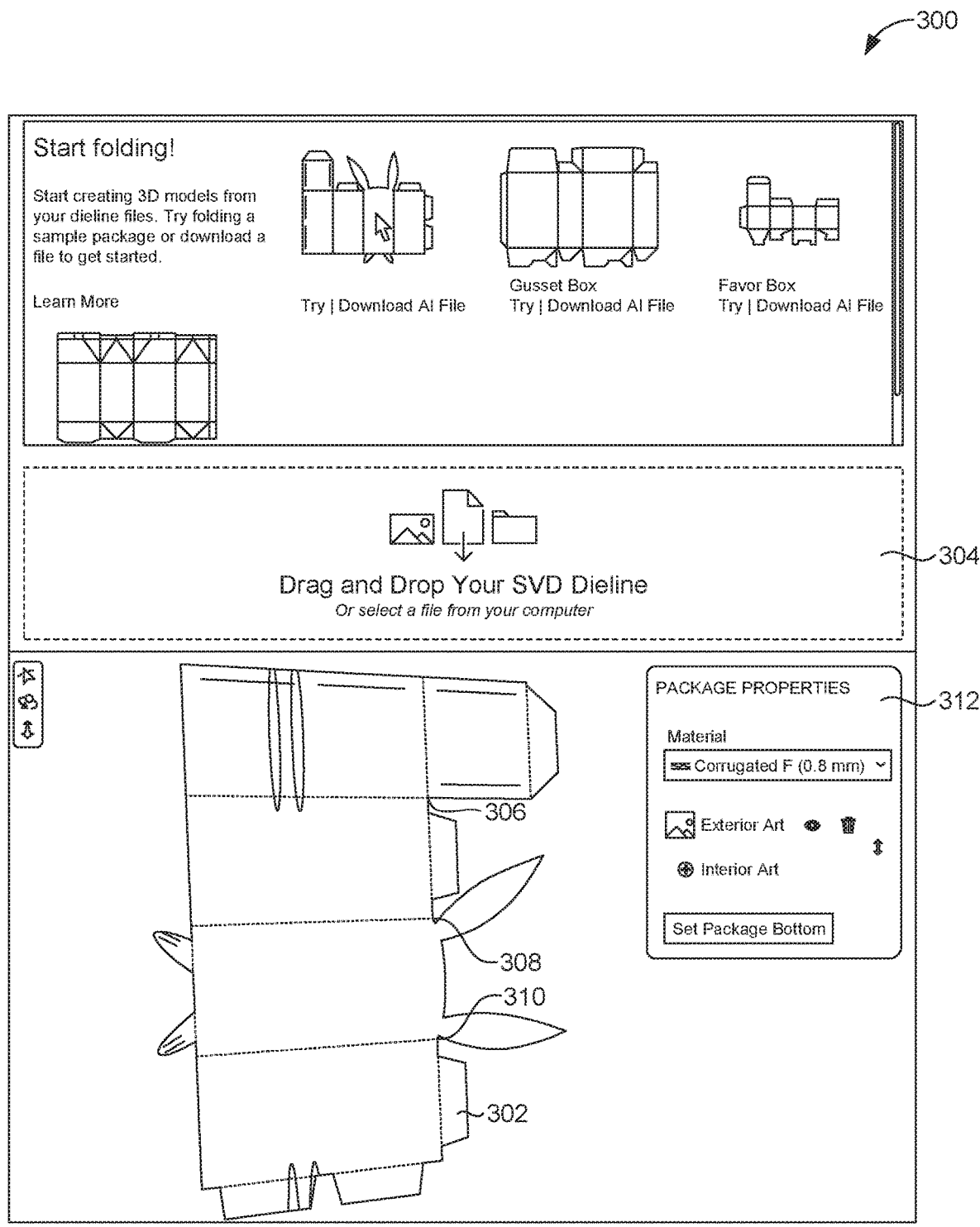
FIGS. 3A-3E depict example graphical user interfaces for implementing a three-dimensional folding tool, according to embodiments of the present invention.
Figure 3B:
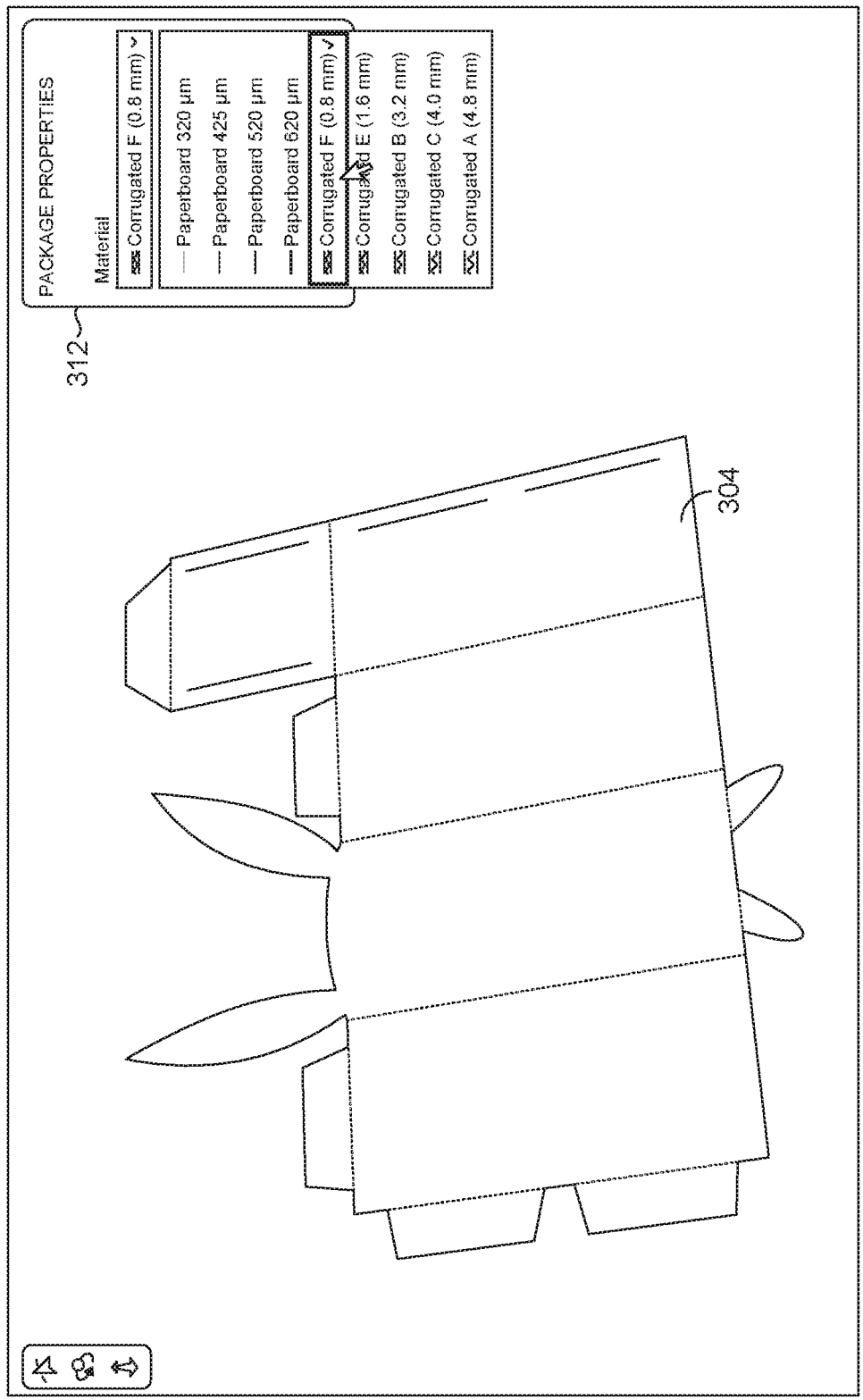

Turning now to FIGS. 3A to 3E, these provide illustrative user interfaces. FIG. 3A provides an illustrative graphical user interface 300 for obtaining an object via a three-dimensional visualization system. As shown, a dieline object may be uploaded or "drag and dropped" into a region 304 to provide the dieline object. In FIG. 3A, the user has provided dieline object 302. As shown, the dieline object 304 includes indicates of fold lines, such as fold lines 306, 308, and 310. Further, the dieline object 302 includes a design graphic for the dieline, but a design graphic is not necessary. A package property panel 312 is also shown. Such a panel 312 may be used to input or provide various properties associated with the dieline object 302. The user can manipulate the dieline object 302 in three-dimensions. As shown in FIG. 3B, the face of the dieline object 304 without a design graphic is now presented via the user interface. Using the panel 312, a user may select to modify the material represented in the dieline object 304.

Figure 3C:
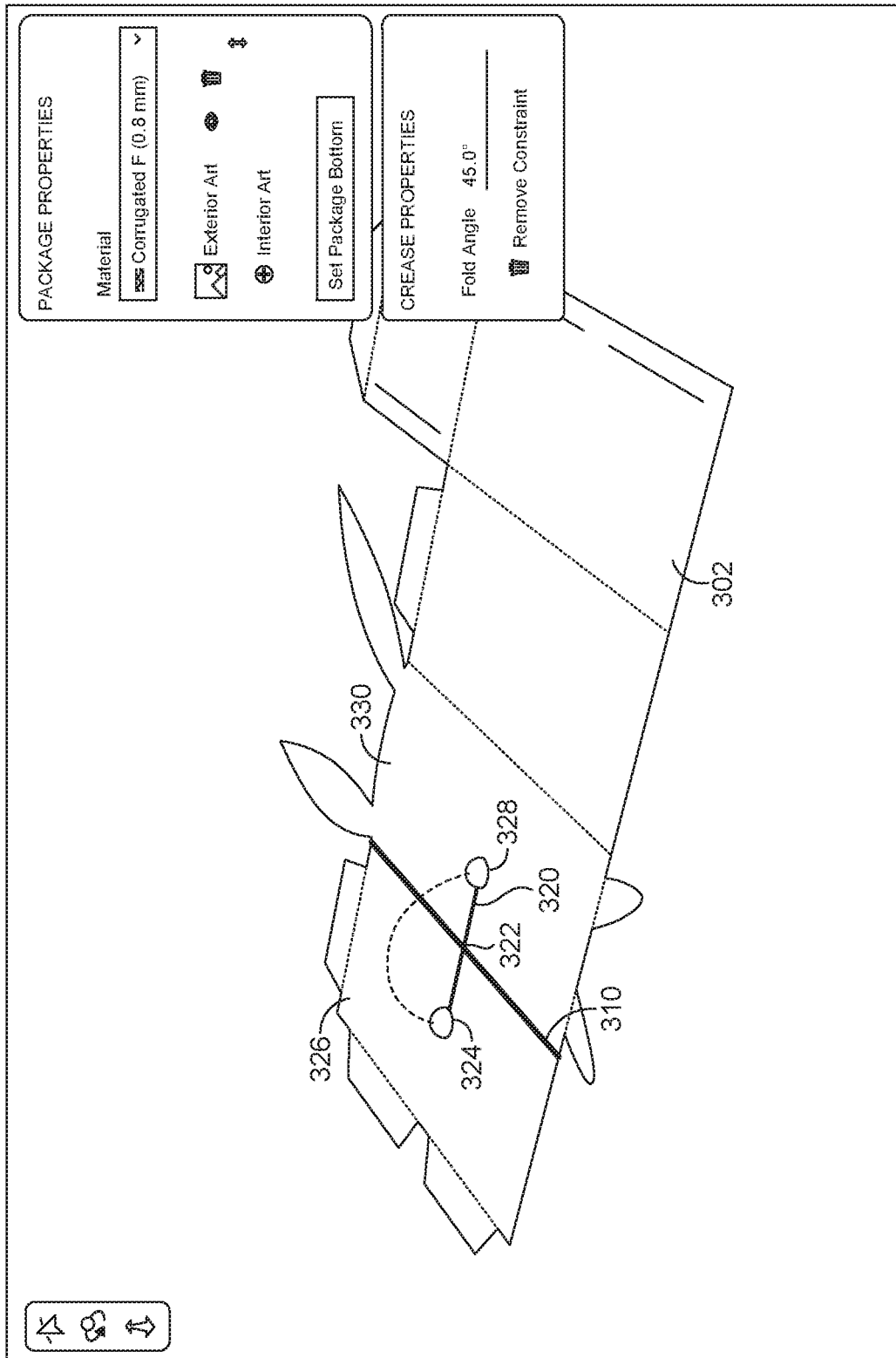

To initiate folding of the dieline object 302, a user may select a fold, or set of folds, about which the object is desired to fold, or rotate. Assume a user selects fold line 310 as a desired fold line for folding the object, as illustrated in FIG. 3C. A user may select fold line 310 in any number of ways, including using a mouse or selector to select the fold line. A shown in FIG. 3C, the selected fold line is visually emphasized. Here, it is emphasized in a bold format, but could be visually emphasized in any number of ways including use of colors, formatting, text, etc. Upon selecting fold line 310, a three-dimensional folding tool 320 is presented. As can be appreciated, the three-dimensional folding tool 320 may be automatically presented upon obtaining a selection of a fold line. As shown, the three-dimensional folding tool 320 is positioned in the center of the length of the fold line 310. Further, a center point 322 is positioned or placed along the fold line 310, with a first handle 324 extending from the center point 322 and positioned or attached to the panel 326 and a second handle 328 extending from the center point 322 in the other direction and positioned or attached to the panel 330. As can be seen in FIG. 3C, only two panels are adjacent to a fold line, in particular, panel 326 and panel 330 are adjacent to the fold line 310.

In embodiments, upon placement of the three-dimensional folding tool 320, either panel 326 and/or 330 may be folded about the fold line 310. Assume here that the user desires to fold panel 326 about the fold line 310. As such, the user selects handle 324 associated with panel 326. By selecting handle 324, the handle 328 and panel 330 are fixed in place such that the panel 330 does not move during folding of panel 326. The selected handle and/or the fixed handle may be visually indicated in some implementations. For example, as shown in FIG. 3C, the fixed handle 328 is shown in a white color, while the selected handle 324 is shown in a gray color, visually emphasizing the selected handle.

Figure 3D:
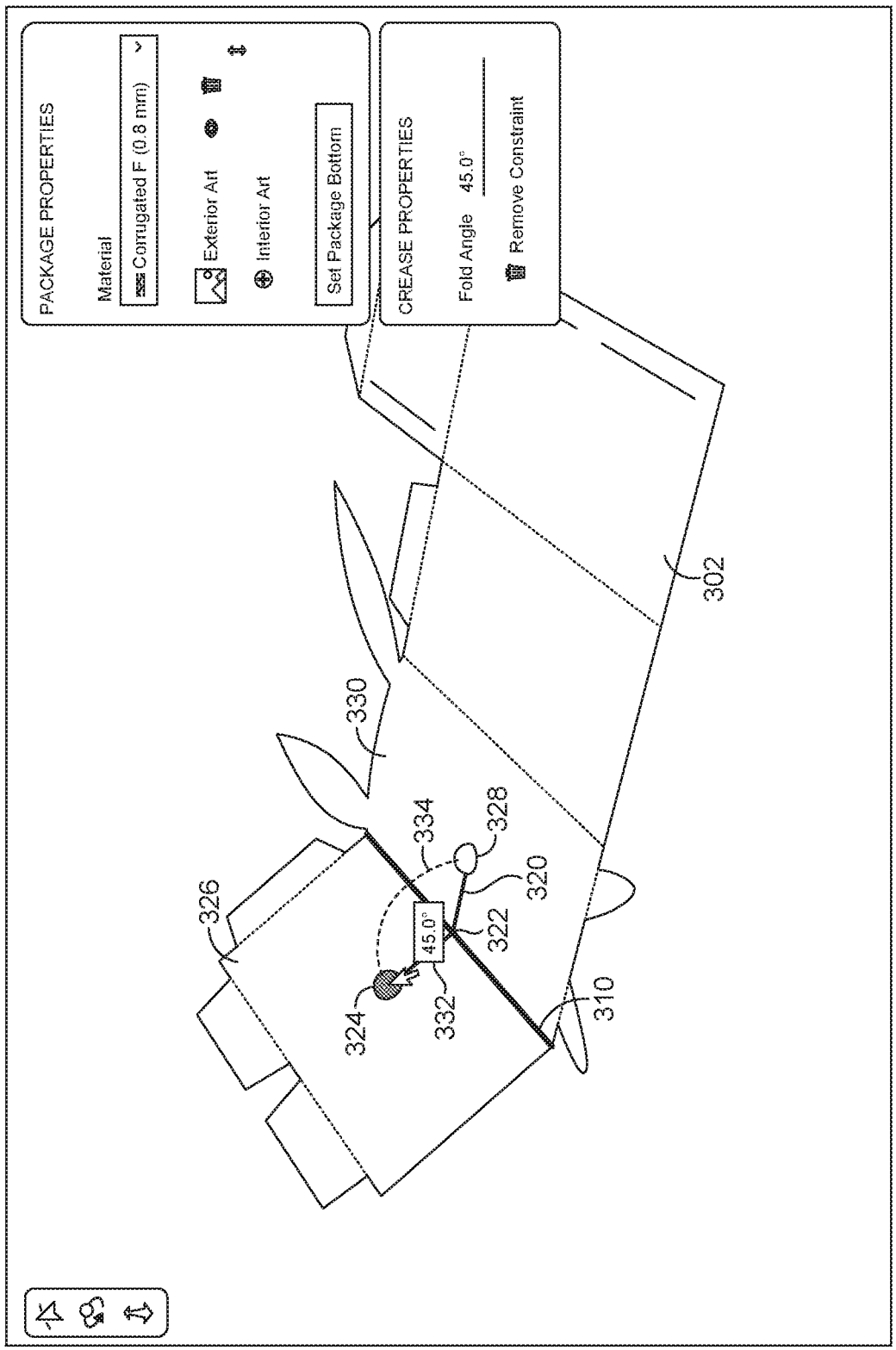

The user may move the handle 324 in a direction to fold the panel 326 about the fold line 310. Although generally discussed herein as selecting and moving a handle, as can be appreciated, in some implementations, the panel may be selected and/or moved to fold the panel about a fold line. In this example, and as shown in FIG. 3D, the user moves the handle 324 in a clockwise rotation, or in a direction to the right, to fold the panel 326 up. The panel 326 folds about the fold line 310 in a manner consistent with the arc 334 spanning between handle 324 and handle 328.

Figure 3E:
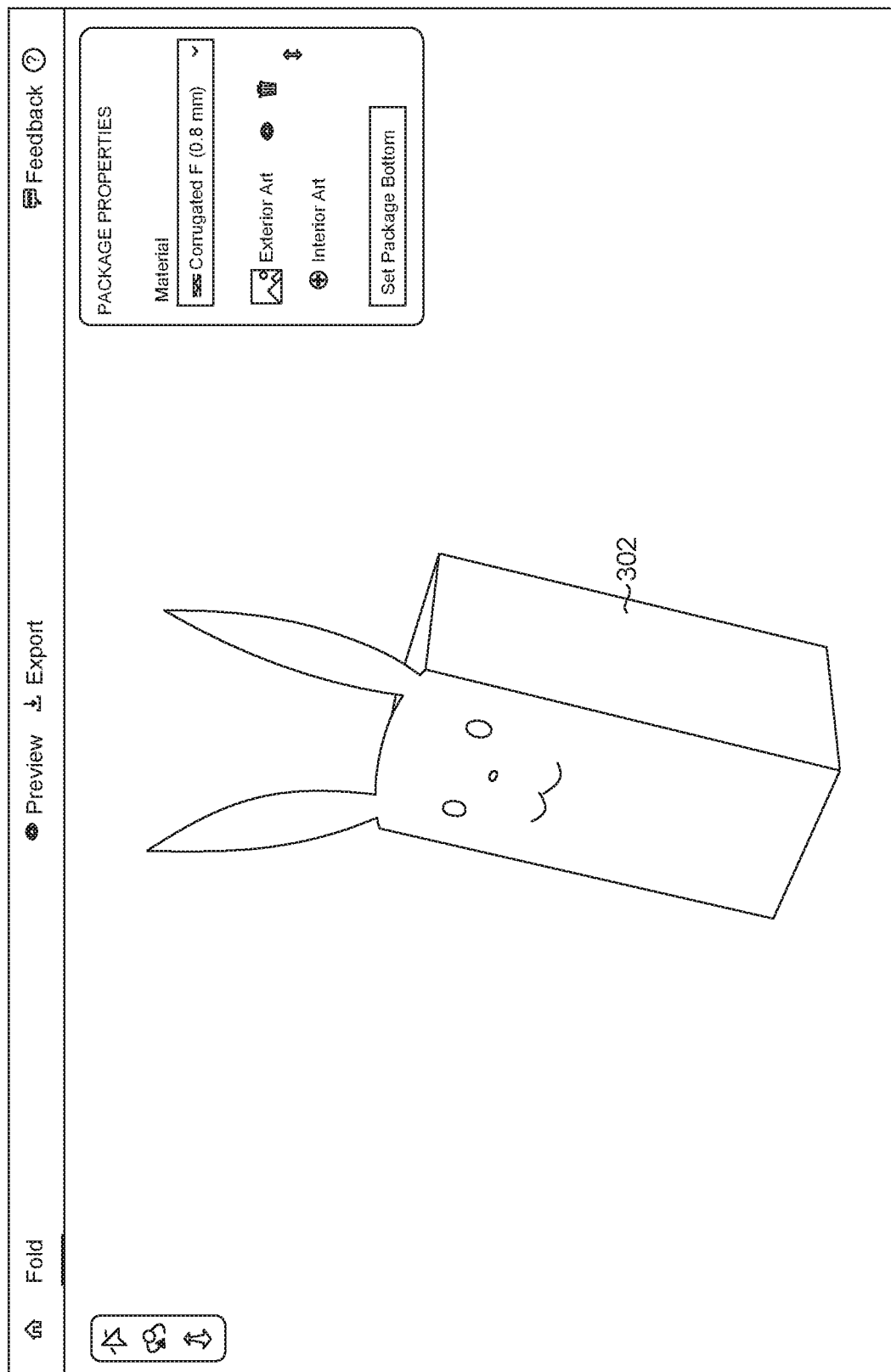

As shown in FIG. 3D, a degree indicator 332 may be presented to show a degree or extent of rotation about the fold line. In some cases, a degree indicator may be presented to show an amount the panel has been rotated. In other cases, a degree indicator may be presented to show a degree associated with a next snapping location. As described herein, the degree indicator may be presented automatically or based on a user selection or manipulation (e.g., hover over the three-dimensional folding tool). A user may continue to select another fold line to fold another panel about the newly selected fold line. Using such an intuitive three-dimensional folding tool enables a user to fold the object 302 efficiently and effectively. FIG. 3E provides an illustration of the object 302 in a final folded version with each panel being folded about the corresponding fold lines. Accordingly, the user may visualize the object in three-dimensions. The user may also export the object as a three-dimensional model into a three-dimensional visualization system, for example, to render the object in a photorealistic manner.

Figure 4:
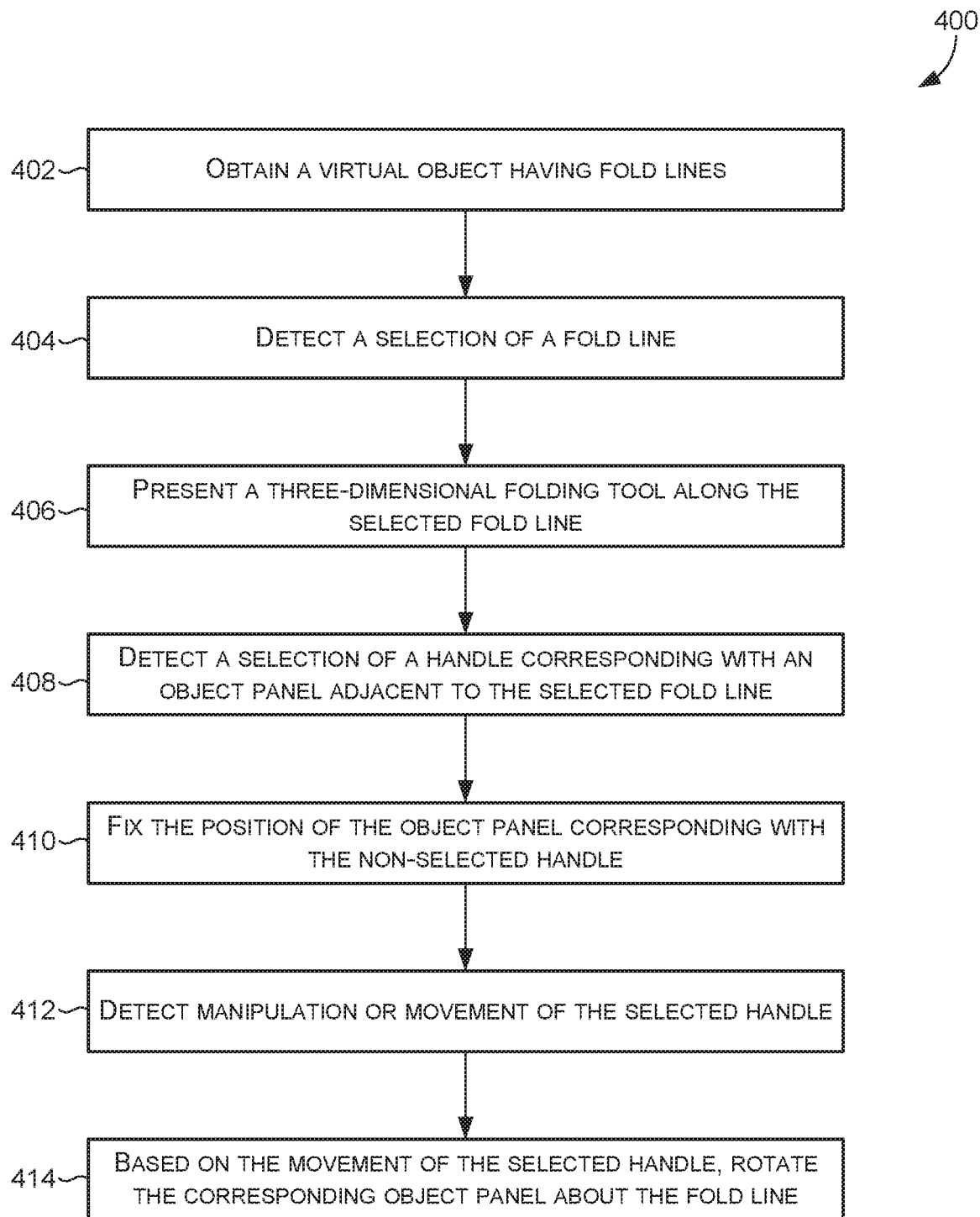
FIG. 4 is a flow diagram showing a first method for facilitating three-dimensional folding in accordance with embodiments of the present disclosure.
Figure 5:
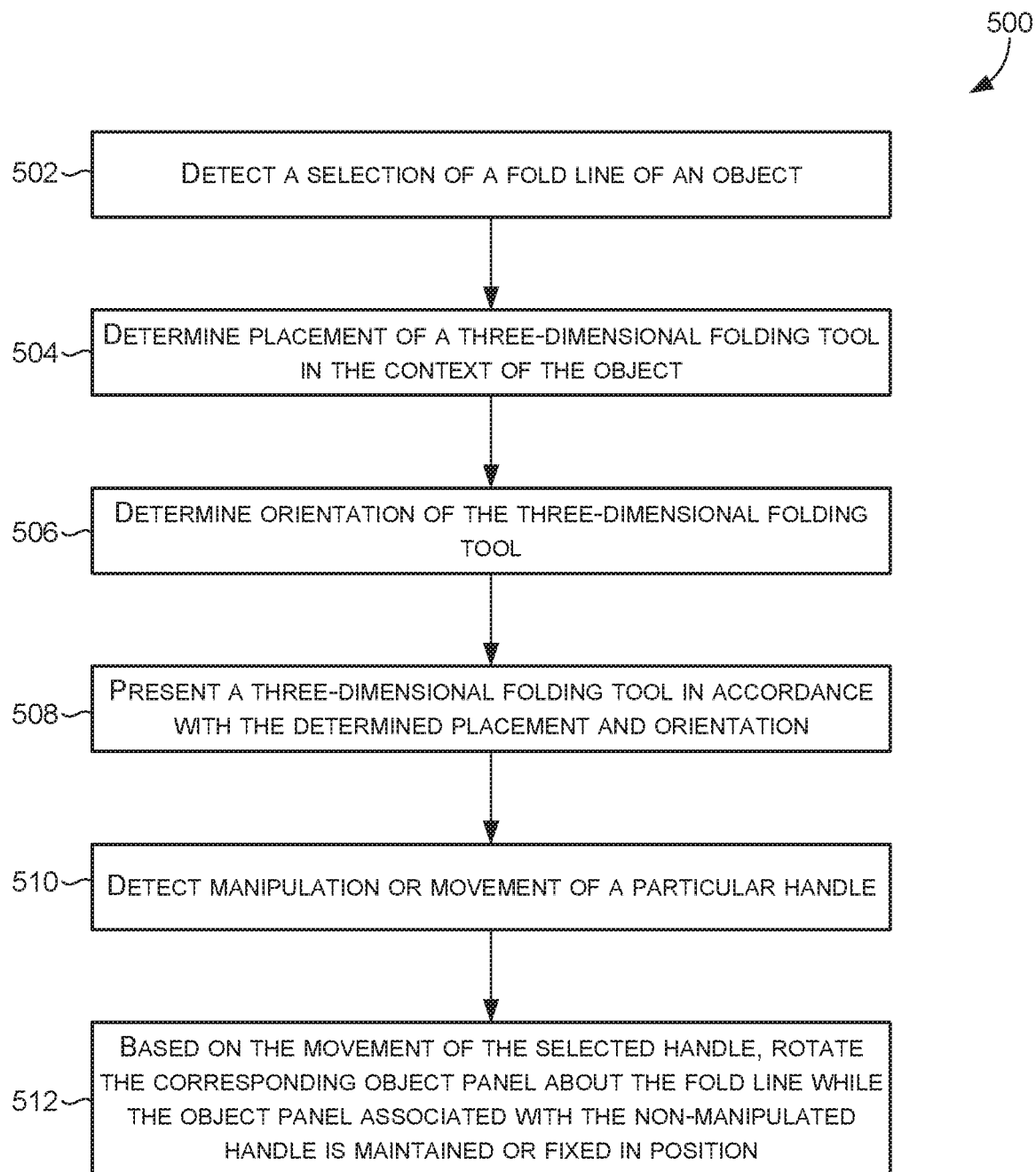
FIG. 5 is a flow diagram showing a second method for facilitating three-dimensional folding in accordance with embodiments of the present disclosure.
Figure 6:
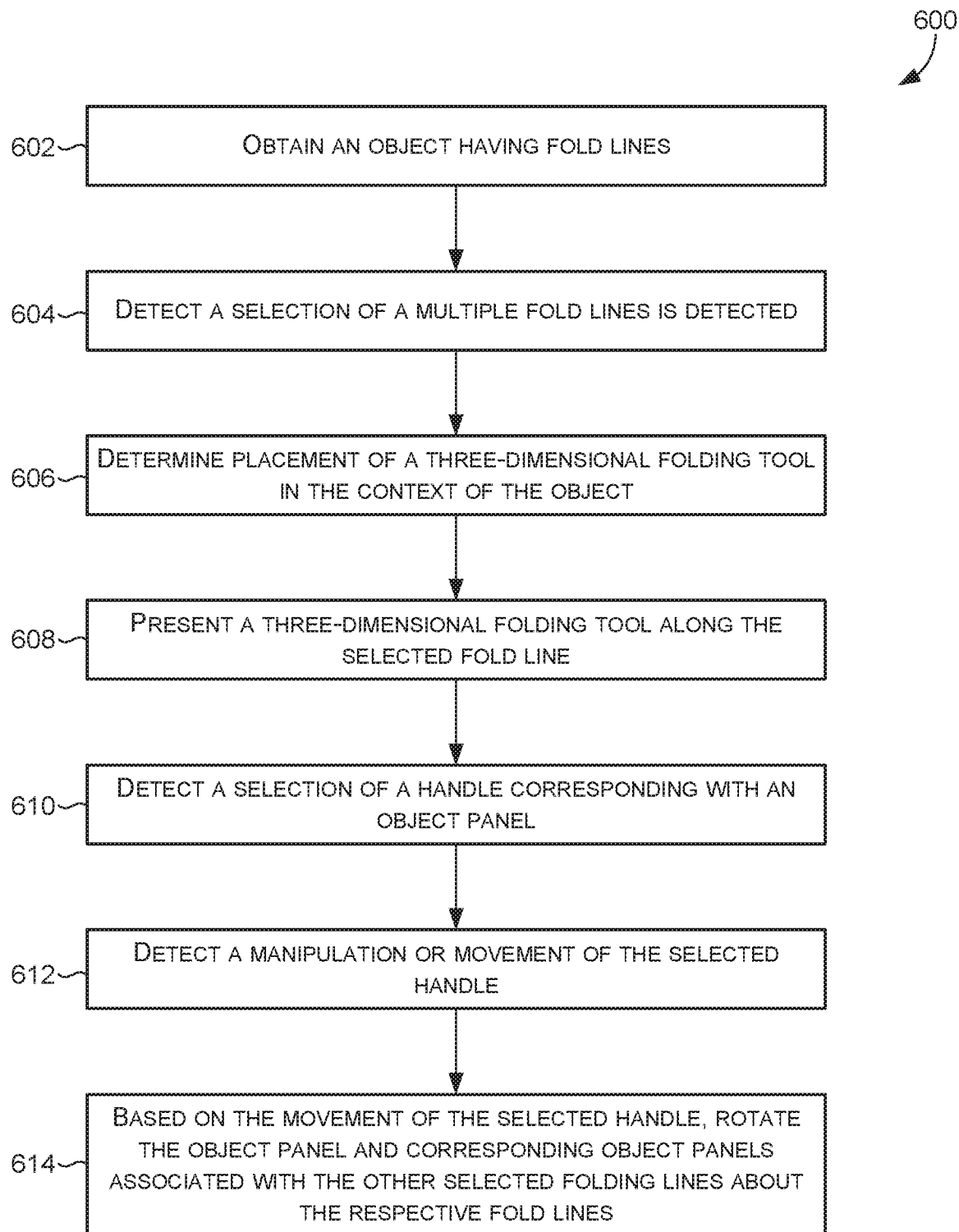
FIG. 6 is a flow diagram showing a third method for facilitating three-dimensional folding in accordance with embodiments of the present disclosure.

With reference now to FIGS. 4-6, FIGS. 4-6 provide method flows related to facilitating three-dimensional folding and implementing a three-dimensional folding tool. Each block of method 400, 500, and 600 comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Turning initially to FIG. 4, a flow diagram is provided showing an embodiment of a method 400 for facilitating three-dimensional folding. Initially, at block 402, a virtual object having fold lines is obtained. A virtual object, or object, may be any foldable object, that is, capable of being virtually folded in association with one or more fold lines. In some cases, a two-dimensional vector drawing may be obtained (e.g., from a data store).

At block 404, a selection of a fold line is detected. For example, a user selection of a fold line may be detected when a user selects a fold line of the object. Thereafter, at block 406, a three-dimensional folding tool is presented along the selected fold line. In embodiments, the three-dimensional folding tool is presented at the center of the selected fold line. The three-dimensional folding tool can be positioned or oriented such that the axis of rotation is illustrated via an arc connecting a handle on one panel adjacent to the fold line and another handle on another panel adjacent to the fold line.

At block 408, a selection of a handle corresponding with an object panel adjacent to the selected fold line is detected. For example, a user may select a handle connected to an object panel along one edge of the fold line or another handle connected to another object panel positioned along another edge of the fold line. Based on a selected handle, the object panel corresponding with the non-selected handle is fixed in position such that it does not rotate about the fold line, as indicated at block 410.

At block 412, manipulation or movement of the selected handle is detected. For instance, a user may drag or move the selected handle in a particular direction. Based on the movement of the selected handle, at block 414, the corresponding object panel is rotated or folded about the fold line. As can be appreciated, the rotation or folding about the fold line can be presented in real time via a three-dimensional folding system.

Referring now to FIG. 5, a flow diagram is provided showing an embodiment of a method 500 for facilitating three-dimensional folding. At block 502, a selection of a fold line of an object is detected. For example, a user selection of a fold line may be detected when a user selects a fold line of the foldable, virtual object. At block 504, placement of a three-dimensional folding tool in the context of the object is determined. For example, the center of the fold line may be determined as a position at which to present the three-dimensional folding tool. At block 506, orientation of the three-dimensional folding tool is determined. As one example, an axis of rotation may be determined based on the axis of the fold line. The axis of rotation can be used to position the three-dimensional folding tool, for example, by aligning an arc of the three-dimensional folding tool with the axis of rotation.

Thereafter, at block 508, a three-dimensional folding tool is presented in accordance with the determined placement and orientation. In presenting the three-dimensional folding tool, one handle is attached or connected with one panel adjacent to the selected fold line and another handle is attached with another panel adjacent to the selected fold line. The three-dimensional folding tool may be overlayed over the object.

At block 510, manipulation or movement of a particular handle is detected. For instance, a user may drag or move the selected handle in a particular direction. Based on the movement of the selected handle, at block 512, the corresponding object panel is rotated or folded about the fold line while the object panel associated with the non-manipulated handle is maintained or fixed in position. As can be appreciated, the rotation or folding about the fold line can be presented in real time via a three-dimensional folding system.

Referring now to FIG. 6, a flow diagram is provided showing an embodiment of a method 600 for facilitating three-dimensional folding via a three-dimensional folding tool. Initially, at block 602, an object having fold lines is obtained. An object, or virtual object, may be any foldable object, that is, capable of being virtually folded in association with one or more fold lines.

At block 604, a selection of a multiple fold lines is detected. For example, a user selection of fold lines may be detected when a user selects fold lines of the object. Thereafter, at block 606, placement of a three-dimensional folding tool in the context of the object is determined. For example, the center of the first selected fold line may be determined as a position at which to present the three-dimensional folding tool. Thereafter, at block 608, a three-dimensional folding tool is presented along the selected fold line. The three-dimensional folding tool can be positioned or oriented such that the axis of rotation is illustrated via an arc connecting a handle on one panel adjacent to the fold line and another handle on another panel adjacent to the fold line.

At block 610, a selection of a handle corresponding with an object panel is detected. For example, a user may select a handle connected to an object panel along one edge of the fold line or another handle connected to another object panel positioned along another edge of the fold line.

At block 612, manipulation or movement of the selected handle is detected. For instance, a user may drag or move the selected handle in a particular direction. Based on the movement of the selected handle, at block 614, the object panel and corresponding object panels associated with the other selected folding lines are rotated or folded about the respective fold lines. As can be appreciated, the rotation or folding about the fold line can be presented in real time, for example, via the three-dimensional folding system. In embodiments, the various object panels may each be folded in a same direction and magnitude.

Turning now to FIG. 7, FIG. 7 provides a diagram of an exemplary computing environment suitable for use in implementation of the present disclosure. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present invention. Distinction is not made between such categories as "workstation," "server," "laptop," "handheld device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 1518 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 700. The computing device 700 may be equipped with depth cameras, such as stereoscopic camera systems, infrared camera systems, RGB camera systems, and combinations of these, for gesture detection and recognition. Additionally, the computing device 700 may be equipped with accelerometers or gyroscopes that enable detection of motion. The output of the accelerometers or gyroscopes may be provided to the display of the computing device 700 to render immersive augmented reality or virtual reality.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A computer-implemented method for facilitating virtual folding, the method comprising:
    causing display of a foldable virtual object having a set of one or more fold lines;
    detecting a selection of a fold line;
    based on the selection of the fold line, causing display of a first handle on a first panel adjacent to the selected fold line and a second handle on a second panel adjacent to the selected fold line;
    causing display of a numerical degree indicator attached to the foldable virtual object,
    wherein the numerical degree indicator is indicative of a first extent of rotation relative to the first panel and the second panel on at least one of the first panel and the second panel;
    detecting a selection of the first handle on the first panel adjacent to the selected fold line;
    fixing a position of the second panel adjacent to the selected fold line based on the selection of the first handle on the first panel adjacent to the selected fold line;
    folding, in response to a movement of the selected first handle on the first panel and in a three-dimensional environment, the first panel about the fold line in a direction of the movement of the selected first handle to a second extent of rotation; and
    updating the numerical degree indicator to show the second extent of rotation, wherein the numerical degree indicator persists to update an extent of rotation as the first panel is folded about the fold line from the first extent of rotation to the second extent of rotation based on movement of the selected first handle.

2. The computer-implemented method of claim 1 further comprising obtaining the foldable virtual object.

3. The computer-implemented method of claim 2, wherein the foldable virtual object is obtained in a two-dimensional form.

4. The computer-implemented method of claim 3 further comprising generating a three-dimensional model from the foldable virtual object obtained in the two-dimensional form.

5. The computer-implemented method of claim 1 further comprising identifying the set of the one or more fold lines.

6. The computer-implemented method of claim 1, further comprising displaying an arc between the first handle and the second handle to indicate the plane of rotation for folding the first panel or the second panel.

7. The computer-implemented method of claim 1, wherein the position of the second panel is automatically maintained without a user selection indicating to fix the location of the second panel.

8. The computer-implemented method of claim 1, wherein the first panel is folded about the fold line in a plane orthogonal to an axis defined by the fold line.

9. The computer-implemented method of claim 1, wherein a selection of a second fold line is detected and a third panel is folded about the second fold line concurrently with the folding of the first panel.

10. The method of claim 1, wherein the first panel is folded about the fold line in accordance with snapping positions having a defined degree increment between the snapping positions, wherein the defined degree increment is determined based on analysis of a position of the first panel, a position of the second panel, and a position of the fold line, and wherein a visual indicator of at least one snapping position is presented in association with the foldable virtual object.

11. A method comprising:
    presenting, on a graphical user interface, a three-dimensional folding tool for folding virtual objects;
    presenting, on the graphical user interface, a virtual object having a set of one or more fold lines,
    wherein the virtual object includes a first panel and a second panel;
    receiving a user selection of a selected fold line of the set of one or more fold lines;
    based on the selection of the selected fold line, overlaying the three-dimensional folding tool extending across the selected fold line;
    presenting a first handle extending from the selected fold line onto the first panel of the virtual object and a second handle on the second panel of the virtual object;
    presenting, on the virtual object, a numerical degree indicator indicative of a first extent of rotation relative to the first panel and the second panel on at least one of the first panel and the second panel;
    detecting a user selection of the first handle on the first panel adjacent to the selected fold line;
    fixing a position of the second panel adjacent to the selected fold line based on the selection of the first handle of the first panel adjacent to the selected fold line;
    rotating, in response to a movement of the selected first handle on the first panel in a first direction, the first panel about the selected fold line in the first direction to a second extent of rotation while the second panel is fixed in place; and updating the numerical degree indicator to show the second extent of rotation.

12. The method of claim 11, wherein the three-dimensional folding tool includes an arc that extends from the first handle to the second handle and indicates a plane of rotation for the first panel and/or second panel.

13. The method of claim 12, wherein the plane of rotation for the first panel and/or second panel is determined based on an axis defined by the selected fold line.

14. The method of claim 11, wherein the numerical degree indicator that indicates an amount of rotation between the first panel and the second panel includes an arc segment.

15. The method of claim 11, wherein the first panel rotates about the selected fold line until a rotation constraint is reached, the rotation constraint indicating a particular amount of rotation at which to stop rotating.

16. One or more non-transitory computer-readable media having a plurality of executable instructions embodied thereon, which, when executed by one or more processors, cause the one or more processors to perform a method comprising:

detecting a selection of a fold line of a foldable virtual object;

based on the selection of the fold line, causing display of a three-dimensional folding tool along the selected fold line, the three-dimensional folding tool including a first handle positioned on a first panel adjacent to the selected fold line, a second handle positioned on a second panel adjacent to the selected fold line, and a numerical degree indicator indicative of a first extent of rotation relative to the first panel and the second panel on at least one of the first panel and the second panel;

determining a plane of rotation for rotating the first panel and/or second panel about the selected fold line, the plane of rotation being determined based on an axis defined by the selected fold line;

detecting a selection of the first handle on the first panel adjacent to the selected fold line; and fixing a position of the second panel adjacent to the selected fold line based on the selection of the first handle on the first panel adjacent to the selected fold line;

rotating, in response to a movement of the selected first handle of the first panel and in three-dimensional user interface, the first panel in the direction of the movement of the selected first handle and along the plane of rotation; and updating the numerical degree indicator to show a second extent of rotation.

17. The one or more non-transitory computer-readable media of claim 16, wherein the three-dimensional folding tool includes an arc visually indicating the plane of rotation for rotating the first panel and/or second panel.

18. The one or more non-transitory computer-readable media of claim 16 further comprising detecting a selection of the first handle to manipulate the first handle.

19. The one or more non-transitory computer-readable media of claim 16, wherein the position of the second panel is automatically maintained without a user selection indicating to fix the location of the second panel.

20. The one or more non-transitory computer-readable media of claim 16, wherein the plane of rotation is a plane orthogonal to the axis defined by the selected fold line.

* * * * *